Dec. 2, 1958  E. C. HARDING ET AL  2,862,295
PIPE CUTTER
Filed April 24, 1958  2 Sheets-Sheet 1
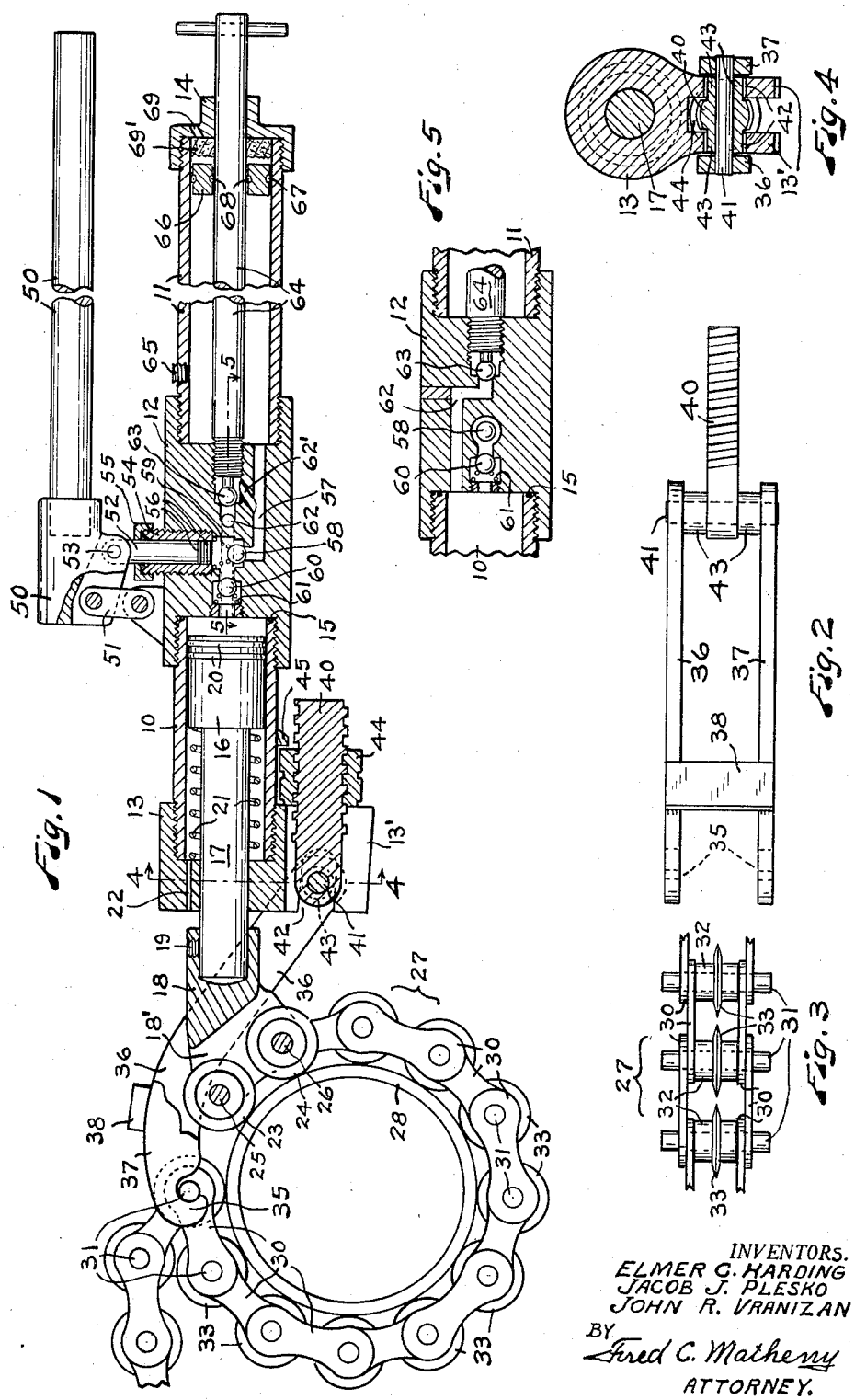
INVENTORS.
ELMER C. HARDING
JACOB J. PLESKO
JOHN R. VRANIZAN
BY
Fred C. Matheny
ATTORNEY.

Dec. 2, 1958  E. C. HARDING ET AL  2,862,295
PIPE CUTTER

Filed April 24, 1958  2 Sheets-Sheet 2

INVENTORS.
ELMER C. HARDING
JACOB J. PLESKO
JOHN R. VRANIZAN
BY Fred C. Matheny
ATTORNEY United States Patent Office 2,862,295
Patented Dec. 2, 1958

2,862,295
PIPE CUTTER

Elmer C. Harding, Seattle, Jacob J. Plesko, Bellevue, and John R. Vranizan, Seattle, Wash., assignors to Spring Load Manufacturing Corporation, Seattle, Wash., a corporation of Washington Application April 24, 1958, Serial No. 730,707

8 Claims. (Cl. 30—92)

This invention relates to a pipe cutter of a type in which a chain or linkage provided with cutting members is used in fracturing a pipe or tubular cylinder of fracturable material.

An object of this invention is to provide a pipe cutter of this type in which a plurality of cutting members can be positioned around a pipe of breakable material in a circular path and applied to the pipe with sufficient force to evenly and smoothly fracture the pipe transversely without being rocked or rotatively moved back and forth around the pipe.

Another object of this invention is to provide a pipe cutter in which hydraulic pressure is used in forcibly applying cutting members to a pipe.

Another object is to provide a pipe cutter of this nature in which two pipe cutting discs rotatively supported by a thrust member of a power step-up device are applied in an off-center or non-radial position to a transversely extending pipe in opposed relation to a cutting chain or linkage which passes around the pipe and carries cutting members and has one part connected with the thrust member and another part connected by tension means with a frame part of the power step-up device.

Another object is to provide a pipe cutter in which a combined power step-up device and handle having two relatively longitudinally movable parts, one of which is a thrust member carrying cutting discs capable of being applied to a pipe in an off-center position, is connected with a cutting chain or linkage on a pipe in such a manner that thrust and tension forces can be exerted in opposite directions along relatively crossed lines by the power step-up device without subjecting the power step-up device to a turning force or moment tending to rotatively move it around the pipe.

Another object is to provide a pipe cutter having longitudinally adjustable means for connecting one part of a pipe cutting chain or linkage to a power step-up device.

Other objects of this invention will be apparent from the following description taken in connection with the accompanying drawings.

Figure 1 is a view in longitudinal section, with parts in elevation and parts broken away, showing a pipe cutter constructed in accordance with this invention as it may appear when applied to a pipe.

Fig. 2 is a detached plan view of a diagonal tension member or yoke and adjusting screw used in connecting a pipe cutting chain to a housing.

Fig. 3 is a plan view showing a fragment of a pipe cutting chain capable of use in connection with this invention.

Fig. 4 is a sectional view taken substantially on broken line 4—4 of Fig. 1.

Fig. 5 is a fragmentary sectional view taken substantially on broken line 5—5 of Fig. 1, showing hydraulic pump means.

Like reference numerals refer to like parts throughout the several views.

Figure 6:
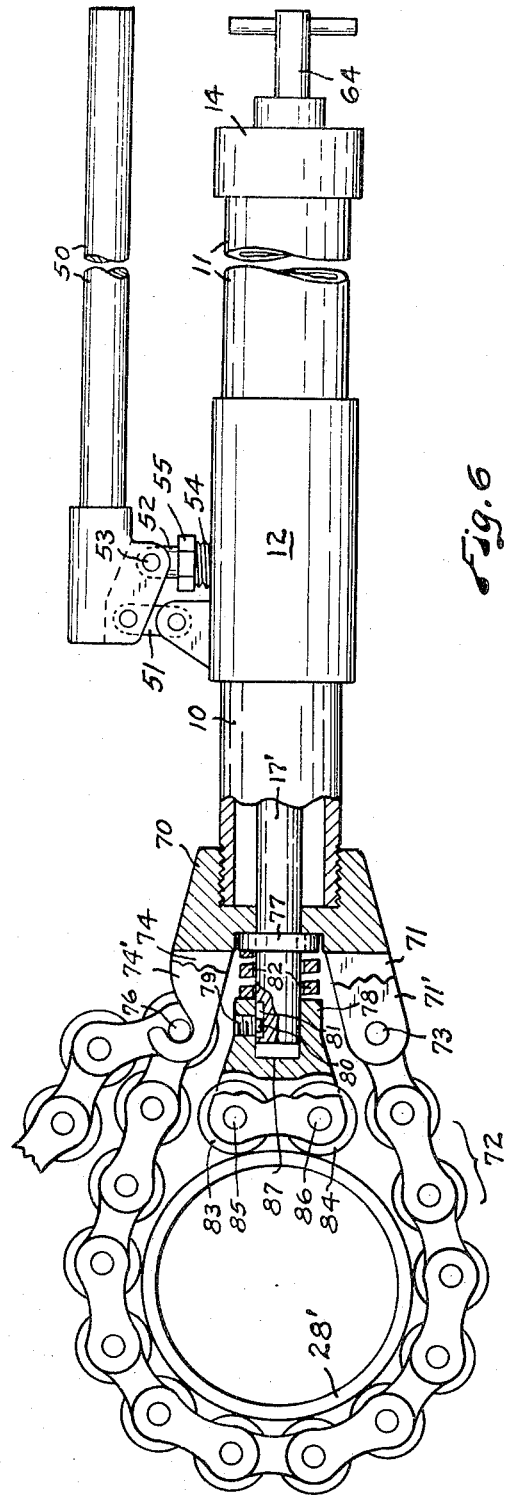
Fig. 6 is a view partly in side elevation and partly in longitudinal section showing a pipe cutter of modified form as it may appear when applied to a pipe.

This pipe cutter comprises a strong and rigid frame which also serves as a handle. For illustrative purposes this frame is shown as being made up of two axially aligned tubular members 10 and 11 threaded into and connected with each other by a block or fitting 12 and provided respectively with end caps 13 and 14. Preferably a sealing ring 15 is provided between the inner end of the tubular member 10 and the fitting 12.

The tubular member 10 serves as a hydraulic cylinder and a piston 16 is reciprocably disposed therein. A piston rod 17 is rigid with the piston 16 and extends outwardly through the end cap 13. A forked fitting 18 of special construction is secured to the outer end of the piston rod 17 by suitable means, such as a set screw 19. Preferably suitable sealing rings 20, which may be conventional O rings, are provided on the end portion of the piston 16 adjacent the fitting 12. Also a compression spring 21 is provided between the piston 16 and end cap 13 to return the piston 16 to a starting or initial position. A pressure relief opening 22 may be provided in the cap 16 to insure atmospheric pressure in the adjacent end portion of the tubular member 10.

The forked fitting 18 has two spaced apart side flanges 18' between which preferably two circular pipe cutting discs 23 and 24 are rotatively mounted on transverse bearing pins 25 and 26 respectively. A pipe cutting chain or linkage, indicated generally by numeral 27, is connected with the bearing pin 26 and is capable of being drawn around a pipe 28. The bearing pin 25 is preferably positioned so that it extends across the projected axis of the piston rod 17. The bearing pin 26 is parallel to the bearing pin 25 and is offset a substantial distance to one side of the axis of the piston rod 17 and is closer than the bearing pin 25 to the cap 13, by a distance about equal to the distance of its transverse offset. This positions the two bearing pins 25 and 26 so that a straight line or plane common to their axes is diagonal to, or at an acute angle of about forty-five degrees relative to the axis of the piston rod 17. This positioning of the axes of the bearing pins 25 and 26 helps in positioning the tool on a pipe which extends transversely of the tool so that the tool is off-center or approximately tangential to the pipe. It also causes the cutting discs 23 and 24 to be applied off-center or non-radially of the pipe for greater efficiency in tensioning the cutting chain 27 on the pipe 28, as hereinafter explained.

Preferably a cutting chain 27 of conventional form is used. This chain comprises links 30 connected by pins 31 which serve as bearings for the hub portions 32 of cutting discs 33. The cutting discs 33, 23 and 24 can be duplicates. The ends of some or all of the pins 31 protrude beyond both sides of the chain, Fig. 3, far enough so that they can be engaged by hooks 35 on the ends of two spaced apart tension members 36 and 37 which form a diagonal yoke capable of connecting the end cap 13 of the pipe cutter frame with a selected part of the cutting chain at a point remote from the chain end which is connected with the pin 26. The two tension members 36 and 37 are preferably curved for clearance purposes and are rigidly connected with each other by a cross bar 38. The cross bar 38 is preferably positioned near the hooks 35 and is welded to the bars 36 and 37. The forked fitting 18 operates between the tension members 36 and 37 and is guided and prevented from turning by these tension members. The bar 38 limits swinging movement in one direction of the tension members 36 and 37 when the hooks 35 are not in engagement with a pin 31 of the cutting chain.

The ends of the bars 36 and 37 remote from the hooks 35 are adjustably connected with two spaced apart integral lugs or flanges 13' of the end cap 13, by means including an adjusting screw 40 and a cross pin 41. The flanges 13' extend sidewise from the cap 13 and are provided with two registering elongated notches or slots 42. The notches 42 receive and guide two tubular bosses or hubs 43 which preferably are rigid with the adjusting screw 40 having flattened sides and having square threads 40 back of the flanges 13'. Preferably a stop lug 45 is provided on frame member 10 to limit movement of nut 44 away from flanges 13'. The end portions of the yoke members 36 and 37 straddle the flanges 13' and have suitable perforations which receive the pin 41. An adjusting screw 40 having flattened sides and having square threads on its edges is herein shown for illustrative purposes but it will be understood that the form of this screw may be varied. The adjustment provided by the screw 40 makes it will be understood that the form of this screw may be which may occur due to the spacing of the pivot pins 31 and due to variations in external sizes of pipes being cut. Eliminating most of the slack from a cutting chain drawn around a pipe minimizes the amount of take-up required by the power step-up means by which the cutting force is applied.

The pull of the tension members 36 and 37 crosses the line of the piston rod 17 so that the forces are well enough balanced to avoid imparting turning moment to the frame or handle of the tool. Also these forces are applied off-center relative to the pipe and in such a manner as to secure maximum efficiency in tightening the cutting chain around the pipe. The cutting discs 23 and 24 are thrust against the pipe at an off-center incline so that they tend to roll on the pipe in a way conducive to tensioning of the cutting chain 27 and at the same time said cutting discs 23 and 24 are applied with maximum and about equally divided cutting force to the pipe. If sufficient force is applied in the manner just described, to the cutting discs 23 and 24 of the thrust means and to the cutting members 33 of the chain 27, it has been found that cast iron pipe and cement pipe and clay or ceramic pipe can be severed or parted by merely applying all of the cutting discs with sufficient force to the pipe and without imparting to these cutting discs any rotary movement on the pipe in addition to the movement imparted to them in the tensioning operation. Uusually one of the cutting discs will start a fracture which will follow the cylindrical path where cutting pressure is applied by the discs, the result being that the pipe will be cleanly and evenly fractured and severed substantially in the plane of the cutting discs. We find it desirable to provide two cutting discs in the fitting 18. These two discs share the load on pipes of varying sizes and reduce the liability of punching a hole in the pipe without causing an annular fracture of the same.

The power step-up means for forcibly applying the cutting members to the pipe may be varied in form and one manually operated hydraulic pump means which can be sucessfully used for this purpose is shown. This pump means is incorporated in the fitting 12 and uses the tubular member 11 as a reservoir for oil or like liquid. Said pump means comprises a pump handle 50 pivoted by a rocker link 51 to the fitting 12 and having a pump plunger 52 connected therewith by a pivot member 53. The plunger 52 is reciprocable in a tubular nipple 54 which is threaded into the fitting 12 and has a packing nut 55 on its outer end. Suitable rings 56 are provided on the lower end portion of the plunger 52 for sealing purposes. On its upward or outward stroke the plunger 52 will draw in oil from the reservoir 11, through a passageway 57 and past a check valve 58 which is yieldingly seated by a compression spring 59. On its downward or inward stroke the plunger 52 will force the oil, thus drawn in, past a second check valve 60, which is normally urged closed by a compression spring 61, and into the cylinder containing piston 16 and formed by tubular frame member 10. Thus oil at high pressure can be forced into cylinder 10 to move the piston 16 toward the end cap 12, this oil always being trapped by check valve 60.

The relief or return flow of oil from the cylinder 10 is through a passageway 62, Figs. 1 and 5, which can be manually opened or closed by regulating a valve 63. A relief control rod 64 extends through the cap 14, is threaded into the fitting 12 and can be manually rotated to either press the valve 63 against its seat and prevent the return flow of oil to the reservoir 11 or to release the valve 63 and allow oil from cylinder 10 to return by way of passageways 62, 62' and 57 to the reservoir 11. Also preferably a free or floating piston 66 is provided in the outer end portion of the reservoir 11 to minimize pressure variations in said reservoir 11. Preferably piston 66 is provided with sealing rings 67 and 68 of O ring type for contact respectively with the wall of tubular member 11 and relief rod 64. A relief opening or vent 69 is provided in end cap 14 and a filter pad 69' is provided in member 11 between cap 14 and floating piston 66.

In the pipe cutter shown in Fig. 6 all frame parts and hydraulic jack devices to the right of the end cap 70 are duplicates of those shown in Figs. 1 and 5, and in so far as these parts are shown, they are similarly numbered.

The end cap 70 is modified in shape to provide preferably two parallel off center lugs 71 and 71' which receive therebetween one end of a cutting chain 72 and to which said chain 72 is attached by a pin 73. The end cap 70 is further provided, at a location approximately diametrically opposite from the lugs 71 and 71' with two spaced apart hook lugs 74 and 74' which may engage with any selected cross pin 76 of the cutting chain 72. The cutting chain 72 can be passed around a pipe 28' and connected at two points with the main frame of the tool.

A piston rod 17', which corresponds to the piston rod 17 of Fig. 1, extends out through the cap 70 and is provided with a rigid annular flange 77, which can seat against the cap 70. A special forked fitting 78 is splined or otherwise slidably supported on the outer end of the piston rod 17' in such a manner that it can move longitudinally a limited amount on said rod 17'. A set screw 79 threaded into the fitting 78 and having an inner end portion 80 seated in a longitudinal groove 81 in the rod 17' can be used to movably secure the fitting 78 on the rod 17'. A strong and sturdy compression spring 82 is interposed between the fitting 78 and the flange 77. Two pipe cutter discs 83 and 84 are rotatively mounted by pivot pins 85 and 86 in the outer end portion of the forked fitting 78. The axes of the pivot pins 85 and 86 are in a plane at right angles to the axis of the piston rod 17'. When the cutting chain 72 extends around a pipe 28' and is tensioned the cutting discs 83 and 84 will abut squarely against the pipe and the handle part of the tool will be caused to assume a position substantially radially of the pipe.

The usual mode of operation of the pipe cutter shown in Fig. 6 is to clamp the tool firmly on the pipe and then to oscillate or rock the tool back and forth partially around the pipe so that the cutting discs will cut a substantially continuous groove around said pipe. After this is done the pipe is fractured along the line of the groove by applying further force to the cutting discs. The spring 82 will resiliently load and cushion all of the cutting discs until longitudinal movement of the fitting 78 on the piston rod 17' is stopped, either by a complete closing of the coils of the spring 82 or by abutment of the end of the piston rod 17' against a wall 87 of the fitting 78. This spring loading of the cutting discs is conducive to smoother operation and greatly helps in starting an annular cut, especially on pipe having a rough or uneven external surface. This is fully explained in the prior patent to Elmer C. Harding, No. 2,639,501, issued May 26, 1953.

After a cut has been started substantially all of the way around a pipe the fracture of the pipe along the line of the cut can usually be completed without further rocking movement of the tool on the pipe by applying force in excess of the force required for maximum compression of the spring 82 and thus applying non-resilient pressure to the cutting discs.

The foregoing description and accompanying drawings clearly disclose preferred embodiments of this invention but it will be understood that this disclosure is merely illustrative and that changes may be made within the scope of the following claims.

We claim:

1. In a pipe cutter, a tubular frame; a piston reciprocable in said tubular frame; a piston rod connected with said piston and extending outwardly from one end of said frame; pump means connected with said frame capable of longitudinally moving said piston and rod relative to said frame; spaced apart pipe cutting discs rotatively mounted in the outer end portion of said rod capable of engaging with a pipe; a pipe cutting chain capable of extending around a pipe with which the pipe cutting discs carried by said rod are engaged, said chain carrying a plurality of pipe cutting discs; and means operable in connecting at least one part of said pipe cutting chain with said frame, whereby longitudinal movement of said piston and rod relative to said frame will forcibly apply all of said pipe cutting discs to said pipe.

2. In a pipe cutter, a frame; a rod supported for longitudinal movement by said frame and extending outwardly from one end of said frame; power step-up means carried by said frame capable of relatively longitudinally moving said rod and said frame; a link chain capable of extending around a pipe and carrying a plurality of pipe cutting discs; a pivot member connecting one end portion of said chain with the outer end portion of said rod, said pivot member having a pipe cutting disc mounted thereon; and means operable in connecting said frame with a part of said chain remote from the part thereof which is connected with said rod and with the chain extending around a pipe, whereby relative longitudinal movement of said frame and said rod in one direction will tension said chain on said pipe.

3. In a pipe cutter, a frame; a thrust member supported for longitudinal movement by said frame and extending beyond an end of said frame; power step up means capable of relatively longitudinally moving said thrust member and said frame; two spaced apart pipe cutting discs rotatively mounted by the outer end portion of said thrust member with their axes positioned in a plane diagonal to the axis of the thrust member; a pipe cutting chain capable of extending around a pipe and carrying a plurality of pipe cutting discs and having one end portion connected with said thrust member adjacent the pipe cutting discs which are rotatively mounted by the thrust member; and means operable in connecting said frame with a part of said chain remote from the end of the chain which is connected with said thrust member, whereby when the discs carried by the thrust member are positioned against a pipe and the chain extended around the pipe relative extensible movement of the frame and the thrust member will forcibly apply the cutting discs carried by the thrust member and cutting discs carried by the chain to the pipe.

4. In a pipe cutter, a hydraulic jack including a tubular frame; a piston rod supported for longitudinal movement by said frame and extending outwardly from one end of said frame; two spaced apart pipe cutting discs rotatively mounted by the outer end portion of said piston rod; a pipe cutting chain capable of extending around a pipe which is positioned crosswise of said piston rod and carrying a plurality of pipe cutting discs and having one end portion thereof connected with the outer end portion of said piston rod; and means operable in connecting said frame with a part of said chain remote from the end of the chain which is connected with said piston rod and with the chain extending around the pipe, whereby extensible movement of said piston rod relative to said frame will forcibly apply the pipe cutting discs carried by the rod and the pipe cutting discs carried by the chain to the pipe.

5. In a pipe cutter, a frame; a thrust member supported for longitudinal movement by said frame and extending beyond one end of said frame; power step-up means carried by said frame capable of relatively longitudinally moving said thrust member and said frame; two spaced apart pipe cutting discs each rotatively mounted in the outer end portion of said thrust member, the rotative mounting of one of said discs being crosswise of and substantially in line with said thrust member and the rotative mounting of the other disc being crosswise of and offset sidewise relative to the thrust member and being closer to the frame than the rotative mounting of the first mentioned disc; a pipe cutting chain capable of extending around a pipe and carrying a plurality of pipe cutting devices, said chain having one end portion connected with the thrust member at the location of the rotative mounting of the transversely offset disc; and means operable in connecting said frame with a part of said chain remote from the end of the chain which is connected with the thrust member and with the chain extending around the pipe, whereby the cutting devices carried by the chain and the cutting discs carried by the thrust member will be forcibly applied to the pipe by relatively extensible movement of the thrust member and frame.

6. In a pipe cutter, a frame; a thrust member supported for longitudinal movement by said frame and extending beyond one end of said frame; power step-up means carried by said frame capable of relatively longitudinally moving said thrust member and said frame; at least two spaced apart pipe cutting discs each rotatively mounted in the outer end portion of said thrust member with their axes transverse to the axis of the thrust member and positioned in a plane diagonal to the axis of the thrust member; a pipe cutting chain having one end portion connected with the outer end of said thrust member, said chain extending around a pipe when the pipe cutter is in use; and a tension member extending diagonally across the axis of said thrust member connecting said frame with a part of said chain remote from the chain end which is connected with said thrust member.

7. In a pipe cutter, a tubular frame; a piston reciprocable in said frame; a piston rod connected with said piston and extending outwardly from one end of said frame; pump means connected with said frame capable of longitudinally moving said piston and rod relative to said frame; two spaced apart pipe cutting discs each rotatively supported by the outer end portion of said piston rod, the axes of the discs being transverse to the axis of the piston rod and the pivotal mountings of the two discs being positioned in a plane diagonal to the axis of the piston rod; a pipe cutting chain extending around a pipe when the pipe cutter is applied to the pipe, said chain having a plurality of pipe cutting discs and having one end portion thereof connected with the outer end of said piston rod; a tension member extending diagonally across the axis of said piston rod; adjustable devices pivotally connecting one end portion of said tension member with said housing at one side of said piston rod, said adjustable devices providing longitudinal adjustment of said tension member relative to said housing; and means operable in connecting the other end portion of said tension member with a part of said cutting chain remote from the end of the chain which is connected with said piston rod.

8. In a pipe cutter, a tubular frame; a piston reciprocable in said frame; a piston rod connected with said piston and extending outwardly from the end of said frame; pump means connected with said frame capable of longitudinally moving said piston and rod relative to said frame; a forked fitting on the outer end of said piston rod; two pipe cutting discs rotatively mounted in said fitting on bearing pins transverse to said piston rod, the bearing pin of one of said discs being substantially in line with the piston rod and the bearing pin of the other disc being offset sidewise and toward the housing relative to the bearing pin which is substantially in line with the piston rod, the plane common to the axes of the two bearing pins being at an acute angle in the order of forty-five degrees relative to the axis of the piston rod; a pipe cutting chain adapted to extend around a pipe, said chain having a plurality of pipe cutting discs and having one end portion connected with said fork shaped fitting adjacent the transversely offset bearing pin; two spaced apart tension links positioned on opposite sides of said piston rod and extending diagonally across said rod; an adjusting screw connected with the ends of said tension links adjacent said frame; a rigid bracket extending sidewise from said frame receiving and guiding said adjusting screw and the adjacent end portions of the tension links; a nut on said screw engaging said bracket providing longitudinal adjustment of said tension links; and hooks on the ends of said tension links remote from the adjusting screw adapted to be connected with a part of said cutting chain remote from the chain end which is connected with said forked fitting.

No references cited.